United States Patent
Takahara et al.

(10) Patent No.: US 10,251,341 B2
(45) Date of Patent: *Apr. 9, 2019

(54) FARM WORK MACHINE, FARM WORK MANAGEMENT METHOD, FARM WORK MANAGEMENT PROGRAM, AND RECORDING MEDIUM RECORDING THE FARM WORK MANAGEMENT PROGRAM

(71) Applicant: Kubota Corporation, Osaka-shi (JP)

(72) Inventors: Kazuhiro Takahara, Sakai (JP); Hiroshi Ikeda, Sakai (JP)

(73) Assignee: Kubota Corporation, Osaka (JP)

( * ) Notice: Subject to any disclaimer, the term of this patent is extended or adjusted under 35 U.S.C. 154(b) by 22 days.

This patent is subject to a terminal disclaimer.

(21) Appl. No.: 15/349,115

(22) Filed: Nov. 11, 2016

(65) Prior Publication Data

US 2018/0084716 A1    Mar. 29, 2018

Related U.S. Application Data

(62) Division of application No. 14/762,004, filed as application No. PCT/JP2013/074253 on Sep. 9, 2013, now Pat. No. 9,521,806.

(51) Int. Cl.
| | |
|---|---|
| *A01D 41/12* | (2006.01) |
| *A01D 41/127* | (2006.01) |
| *A01B 76/00* | (2006.01) |
| *G06Q 50/02* | (2012.01) |

(52) U.S. Cl.
CPC ............ *A01D 41/127* (2013.01); *A01B 76/00* (2013.01); *G06Q 50/02* (2013.01)

(58) Field of Classification Search
CPC .................................................. A01D 41/127
See application file for complete search history.

(56) References Cited

U.S. PATENT DOCUMENTS

| | | | |
|---|---|---|---|
| 5,712,782 A | 1/1998 | Weigelt et al. | |
| 5,870,689 A * | 2/1999 | Hale | A01B 79/005 702/5 |
| 6,907,319 B2 * | 6/2005 | Hoelscher | A01M 7/0089 111/7.2 |

(Continued)

FOREIGN PATENT DOCUMENTS

| | | |
|---|---|---|
| DE | 10217398 A1 | 1/2003 |
| JP | 58-7507 U1 | 1/1983 |

(Continued)

*Primary Examiner* — Alex C Dunn
(74) *Attorney, Agent, or Firm* — The Webb Law Firm (57) ABSTRACT

A farm work machine (1) operable in a variety of work modes includes a communications unit (5) that reads farm work information for a selected target farm work sector from a database of a management center storing the farm work information for each farm work sector, a work mode setting unit (46) which sets work modes, a work mode comparison unit (53) that effects comparison between a set work mode set by the work mode setting unit and a registered work mode included in farm work information read from the database, and a display data generation unit (55) that generates display data in order to display, on a display, the read farm work information and a result of the comparison effected by the mode comparison unit.

9 Claims, 7 Drawing Sheets

(56) References Cited

U.S. PATENT DOCUMENTS

| | | | |
|---|---|---|---|
| 6,999,877 B1* | 2/2006 | Dyer | G06Q 10/00 702/2 |
| 7,010,425 B2* | 3/2006 | Gray | A01B 69/008 172/2 |
| 7,216,033 B2 | 5/2007 | Flann et al. | |
| 8,204,654 B2 | 6/2012 | Sachs et al. | |
| 8,224,516 B2 | 7/2012 | Anderson | |
| 8,498,788 B2* | 7/2013 | Kondekar | A01B 69/00 701/445 |
| 8,738,238 B2 | 5/2014 | Rekow | |
| 9,152,938 B2* | 10/2015 | Lang | A01B 79/005 |
| 9,684,879 B2* | 6/2017 | Dlott | G06Q 30/02 |
| 2002/0022929 A1* | 2/2002 | Ell | A01B 79/005 702/5 |
| 2002/0103688 A1* | 8/2002 | Schneider | A01B 79/00 705/7.28 |
| 2004/0145241 A1 | 7/2004 | Arakawa et al. | |
| 2005/0177297 A1* | 8/2005 | Berger | A01B 67/00 701/93 |
| 2007/0073457 A1* | 3/2007 | Lee | B60R 16/023 701/50 |
| 2009/0253454 A1* | 10/2009 | Sampson | H04M 1/72566 455/550.1 |
| 2012/0072322 A1 | 3/2012 | O'Neil | |
| 2012/0185141 A1 | 7/2012 | Kamado et al. | |
| 2012/0197465 A1* | 8/2012 | Gotou | E02F 9/205 701/2 |
| 2013/0282224 A1* | 10/2013 | Yazaki | A01D 34/008 701/24 |
| 2013/0311218 A1* | 11/2013 | Maeda | G06Q 10/063 705/7.11 |
| 2014/0244100 A1* | 8/2014 | Kusuno | G07C 5/0841 701/31.5 |
| 2015/0186387 A1* | 7/2015 | Funabashi | G06Q 50/02 707/723 |
| 2015/0351320 A1* | 12/2015 | Takahara | A01B 76/00 701/50 |
| 2018/0025560 A1* | 1/2018 | Matsuzaki | A01B 69/007 701/23 |

FOREIGN PATENT DOCUMENTS

| | | |
|---|---|---|
| JP | 09-208181 A | 8/1997 |
| JP | 11-299351 A | 11/1999 |
| JP | 2971388 B | 11/1999 |
| JP | 2004-187584 A | 7/2004 |
| JP | 2004-213239 A | 7/2004 |
| JP | 2004-248621 A | 9/2004 |
| JP | 2006-224968 A | 2/2005 |
| JP | 2005-059779 A | 3/2005 |
| JP | 2005-182153 A | 7/2005 |
| JP | 2006-121924 A | 5/2006 |
| JP | 2006-246845 A | 9/2006 |
| JP | 2007-248347 A | 9/2007 |
| JP | 2008220337 A | 9/2008 |
| JP | 2011-018303 A | 1/2011 |
| JP | 2011-077980 A | 4/2011 |

* cited by examiner

| field name : backside of pump | |
|---|---|
| work period | October 25 |
| | 10 : 30 ~11 : 30 |
| average protein content | 6.5% |
| average moisture content | 22.5% |
| harvest amount | 1500kg |
| fuel consumption | 12.3L | return

FARM WORK MACHINE, FARM WORK MANAGEMENT METHOD, FARM WORK MANAGEMENT PROGRAM, AND RECORDING MEDIUM RECORDING THE FARM WORK MANAGEMENT PROGRAM

CROSS-REFERENCE TO RELATED APPLICATIONS

This application claims priority to U.S. patent application Ser. No. 14/762,004, filed Jul. 20, 2015, which is the United States national phase of International Application No. PCT/JP2013/074253 filed Sep. 9, 2013, and claims priority to Japanese Patent Application No. 2013-008733 filed Jan. 21, 2013, the disclosures of which are hereby incorporated in their entirety by reference.

TECHNICAL FIELD OF THE INVENTION

The present invention relates to a farm work machine operable in a variety of work modes, a farm work management method for managing farm work through data communication with the farm work machine, a farm work management program, and a recording medium recording this farm work management program.

BACKGROUND OF THE INVENTION

In recent years, there has been increase in commissioned business for carrying out a farm work using a farm work machine owned by an individual or a corporation, with the farm work machine moving from one farm field to another which farm fields are present in geographical distribution. A management center manages farm works which are planned and implemented for many farm fields.

For instance, Patent Document 1 discloses a farm work management system intended to implement a work for each unit farm field in an efficient manner. According to this farm work management system, a farm work machine identifies its own position via reception of radio wave from a GPS satellite and displays a map showing a farm field located in its vicinity, together with an ID number uniquely assigned to this farm field on a monitor screen of an information terminal device. Further, to an electronic controller for controlling the information terminal monitor, there is connected a mobile terminal configured to transmit, via wireless communication, various kinds of information including the farm field ID information related to the farm field in which the farm work machine is located. With this, a host computer disposed in a base station can receive the information from the mobile terminal. After the ID number of the farm field where this farm work machine is located is inputted from the information terminal monitor, if the farm field ID number of the farm field where the farm work machine is located, which ID number is deduced via reception of radio wave from the GPS satellite, is found erroneous, then, the electronic controller can correct the ID number to the correct farm field ID number which has been inputted from the information terminal monitor.

Further, a farm work machine management device configured to divide a farming ground into multiple sectors and to record a work by a farm work vehicle for each sector is known from Patent Document 2. A management terminal unit of this management device includes a communication means operable to establish communication with a controller of a work vehicle, a DVD reader for reading map data from a DVD medium, a GPS receiver and a gyro sensor. With this, the management device retrieves an outer shape of a work field from map data, divides the retrieved work field map data into sectors and records therein local information (presence of an obstacle such as an electric pole, etc.). Moreover, in case the farm work vehicle is a combined harvester, a total discharge amount of rice crops obtained by a harvesting work can be inputted thereto as a harvest amount for the farm field as a whole.

Regarding such an operation as a rice crop discharge from a grain tank or fuel replenishment on a site of farm work by a combined harvester, a technique, is known from Patent Document 3 which provides a worker present on the ground with information via a mobile phone so that the worker can cope with such operation as above appropriately. In the known technique, a mobile phone is configured as a displaying means for displaying information generated by the combine harvester. As a grain tank filling amount or fuel remaining amount can be displayed on the mobile phone carried by a worker, even when the worker is alighted from the combine harvester, the worker can grasp a fuel situation of the combine or the filing situation of the grain tank.

PRIOR ART DOCUMENTS

[Patent Documents]
Patent Document 1: Japanese Unexamined Patent Application Publication No. 2007-248347 (JP 2007-248347 A)
Patent Document 2: Japanese Unexamined Patent Application Publication No. 2004-213239 (JP 2004-213239 A)
Patent Document 3: Japanese Unexamined Patent Application Publication No. 2006-121924 (JP 2006-121924 A)

SUMMARY OF THE INVENTION

Problem(s) to be Solved by Invention

With use of a mobile communication terminal such as a mobile phone or a smart phone which can be connected to a farm work machine, it is made possible indeed to check information generated by the farm work machine via the mobile phone or to transmit such information to a management center to be recorded therein. However, for a worker who carries out a commissioned work as described at the onset of this disclosure, even for similar farm works, different specifications will be required for each individual farm work sector (e.g. a farm field delimited by a ridge or the like), so it is an important task for the worker to carry out a farm work according to such particular specifications. For example, in the case of a rice harvesting work, for each individual farm field, different specifications will be required, such as a cropping height, a straw processing method (whether a straw is to be cut before being dropped on the ground (cutter work) or dropped as it is (dropper work)), a cutting length of straw, etc. Then, in order to adapt the farm work machine to such different specifications of farm work, the farm work machine is configured to allow setting of a plurality of work modes to suit these various specifications. However, it renders a significant burden on a worker part to set a correct work mode to the farm work machine to comply with work specifications which differ for each farm work sector.

In view of the above-described state of the art, an object of the present invention is to provide a technique that allows easy and reliable setting of a work mode to a farm work machine to comply with a farm work specification required for each individual farm work sector.

Solution(s) to the Problem(s)

The above-noted object is fulfilled according to the present disclosure as under.

A farm work machine operable in a variety of work modes, comprising:
- a communication unit that can read farm work information for a selected target farm work sector from a database of a management center storing the farm work information for each farm work sector, with using a communication network;
- a work mode setting unit that sets work modes;
- a work mode comparison unit that effects comparison between a set work mode set by the work mode setting unit and a registered work mode included in farm work information read from the database; and
- a display data generation unit that generates display data based on the farm work information and the result of the comparison in order to display the farm work information read by the communication unit and result of the comparison effected by the mode comparison unit on a display.

With the above-described configuration, once a target farm work sector (e.g. a farm field delimited by a ridge or the like) where a farm work is now to be carried out has been selected, a registered work mode assigned to this particular target farm work section is sent from the database of the management center. Then, this registered work mode is compared, with a set work mode currently set to the farm work machine. And, display data for displaying result of this comparison will be generated. Therefore, a worker can grasp easily and reliably whether the work mode currently set to the farm work machine in agreement with the work mode registered in advance in the management center or not. The work mode will include e.g. setting parameters for implements specified for carrying out a variety of works. Therefore, the farm work can be carried out in an appropriate work mode.

Incidentally, as some non-limiting examples of specific parameters to be included in the work mode, in the case of a combine harvester employed as the farm work machine for instance, there can be cited parameters based on farm field conditions such as a rice field, wheat field, a cutter field (where straws will be cut and discharged), a dropper field (where straws will be discharged without being cut) and seed rice sowing field; or work machine parameters such as a harvesting height, a traveling speed, etc.

If the work mode currently set to the farm work machine and the work mode registered in advance in the management center are not in agreement, normally, it is the work mode currently set to the farm work machine that will be changed in accordance with the registered work mode. However, if the registered work mode is deemed apparently unsuitable as a work mode for the farm work sector to be worked by the farm work machine, for example, if the farm work section is a rice field, yet the registered work mode is a work mode for wheat, then the registered work mode needs to be changed appropriately. For this reason, according to one preferred embodiment of this disclosure, there is provided a mode change instruction outputting unit for outputting a mode change instruction for changing the set work mode or the registered work mode.

For a worker supposed to carry out a farm work entrusted and commissioned by a farm, selection or identification of a target farm work sector (a field commissioned for a farm work by a particular farm) proves often difficult with the worker's visual observation alone. For this reason, according to one preferred embodiment of this disclosure, an arrangement is provided such that selection of the target farm work section is made based on a current position detected by a position detection unit. With this, the selection will be made based, not on visual observation, but on position detection using a GPS module or a direction sensor. As a result, accurate selection of the target farm work sector will be made possible.

According to a further preferred embodiment of this disclosure, there is provided a work evaluation information outputting unit for outputting evaluation information of the farm work effected in the work mode at the time of completion of this farm work; and the display data generation unit generates display data based on the evaluation information to display contents of this evaluation information on the monitor. With this configuration, it is made possible to check, visually via the display presented based on the display data, e.g. a work period or a work traveling distance of the work machine and/or condition of the farm products as the object of the farm work. Further, such evaluation information can be utilized as work site information useful for formulating future farm management strategy. Therefore, still preferably, the evaluation information is sent via the communication unit to the management center to be managed therein.

Still preferably, an arrangement is provided to allow reporting of information useful during the work to the worker, with utilizing of the configuration allowing data exchange between the form work machine and the management center via the communication unit. Particularly useful information is such information as one needed for appropriate management of an utility implement included in the farm work machine. For this reason, according to one preferred embodiment of this disclosure, there are provided a guide information storage unit for storing implement operation guide information for each work mode and an implement monitoring unit for monitoring a condition of a utility implement; and in accordance with an instruction from the implement monitoring unit, implement operation guide information for an implement as a monitoring target is read from the guide information storage section and provided to the display data generation unit.

A mobile communication terminal such as a smart phone, a tablet computer or the like has a communication function and a displaying function and is also operable to carry out various data processing operations with installment of programs (applications) thereto. And, in the art, there is also established for ready use a standard for allowing connection between such mobile communication terminal and a vehicle-mounted LAN mounted on a farm work machine. For this reason, according to one preferred embodiment of this disclosure, the communication unit comprises a mobile communication terminal that is operable to perform data communication with a communication unit included in the farm work machine, and the work mode comparison unit and the display data generation unit are included in the mobile communication terminal.

The subject matters of this disclosure include also a farm work management method to be implemented by a mobile communication terminal that is operable to perform data communication with a farm work machine used for carrying out a farm work in a work mode set by a work mode setting unit among a variety of work modes. The subject matters of this disclosure further include a farm work management program installed on a mobile communication terminal that is operable to perform data communication with a farm work machine used for carrying out a farm work in a work mode set by a work mode setting unit among a variety of work modes, as well as a recording medium recording such a farm work management program. For instance, the farm work management program according to the present disclosure causes a computer to execute:

a farm work information acquisition function capable of reading farm work information for a selected target farm work sector from a database of a management center storing the farm work information for each farm work sector via a communication network;

a work mode comparison function that effects comparison between a set work mode set by a work mode setting unit and a registered work mode included in farm work information read from the database; and a display data generation function that generates display data based on the farm work information and result of the comparison in order to display the read farm work information and the result of comparison on a display.

Functions/effects provided by the computer program are substantially the same as those described above regarding the corresponding functions provided by the farm work machine. Also, substantially the same functions/effects can be achieved by the recording medium according to this disclosure recording the farm work management program, and the farm work management method according to this disclosure. Incidentally, the recording medium above can be any non-transient and tangible medium such as a USB memory, an SD card (registered trademark).

EMBODIMENTS FOR CARRYING OUT THE INVENTION

Figure 1:
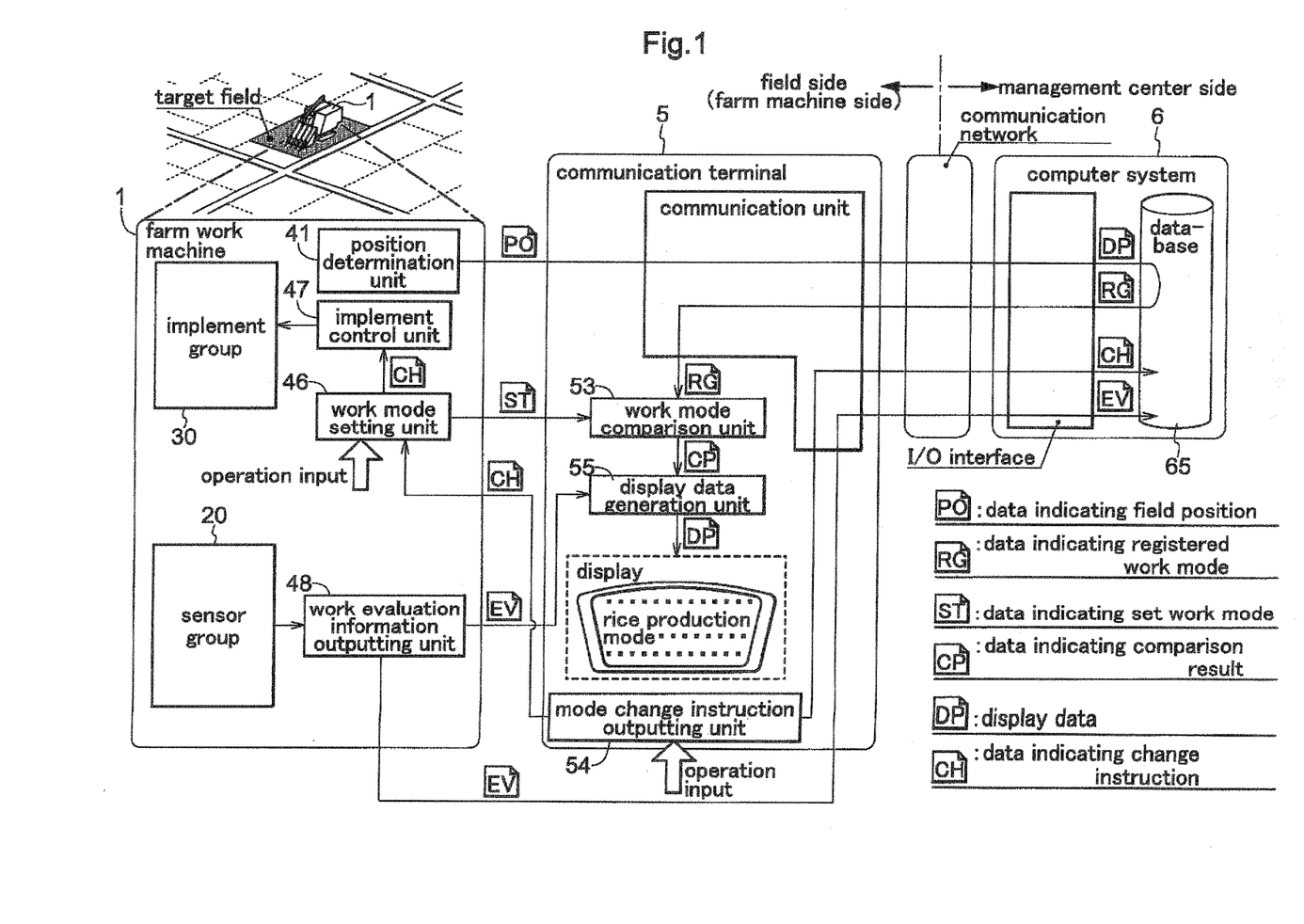
FIG. 1 is a schematic diagram illustrating a basic principle of this disclosure.

Before describing specific embodiments of this disclosure, a basic principle of this disclosure will be described with reference to FIG. 1. FIG. 1 shows a farm management model including a farm work machine 1, a communication terminal 5 and a computer system 6 disposed in a management center. The farm work machine 1 includes a control unit called ECU having various processing functions embodied in the form of software and/or hardware. This control unit includes: an implement control unit 47 for controlling a group of utility implements 30 consisting of various operational machines or work implements for carrying out farm works; and a work mode setting unit 46, for example. The farm work machine 1 has work modes for realizing a variety of work modes. The work mode setting unit 46 sets, into the implement control unit 47, work parameters for the implement group 30 included in the respective work modes. The control unit further includes a work evaluation information outputting unit 48 that evaluates an implemented condition of one unit of farm work at the time of its completion and generates work evaluation information. This work evaluation information includes a work amount, a work period, etc.

The communication terminal 5 can be connected to the control unit of the farm work machine 1 and the computer system 6 to be able to carry out data communication therewith. The communication terminal 5 can be configured as a stationary type mounted on the farm work machine 1, but can also be a mobile communication terminal to be carried by a worker. In whichever cases, the farm work machine 1 is associated with the communication terminal 5 in this disclosure so that the communication terminal 5 may act as a communication unit capable of data communication. For the data communication between the communication terminal 5 and the computer system 6, a WAN such as a mobile phone network and the internet is suitable. Further, for the data communication between the communication terminal 5 and the control unit of the farm work machine 1, a short-distance communication such as a wireless LAN or the like is suitable, but this can also be a wired communication.

Upon arrival at a target work sector (simply "field" hereinafter) which is a work site of the worker, the farm work machine 1 determines the geographical position of this field and acquires data indicative of the field position; and then transmits, via the communication network from the communication terminal 5, the position data to the computer system 6 functioning as a server or a cloud system on the side of the management center. The computer system 6 makes an access to a database 65 and retrieves therefrom a registered work mode indicative of a work mode assigned to this field, and returns it to the communication terminal 5. Simultaneously therewith, a set work mode, which is a currently set work mode, is read from the work mode setting unit 46 included in the farm work machine 1.

Then, the acquired registered work mode and the set work mode are compared with each other by a work mode comparison unit 53, thus checking presence of any difference in the parameters constituting each work mode. The contents indicative of the result of this comparison are generated by a display data generation unit 55 into display data, and displayed on a display device such as a liquid crystal display. For instance, if rice production is assigned to this field in the computer system 6 of the management center, whereas the work mode of the farm work machine 1 is currently set to a wheat production work mode, then, a message "This field is for wheat production" will be displayed to alert the worker. Alternatively, respective parameters of the registered work mode and the set work mode can be displayed in the form of a list for comparison, with different items being highlighted to alert the worker.

If any difference exists between the registered work mode and the set work mode, the work mode whichever erroneous will be changed either automatically or with an operation input by the worker. For example, if it is determined that the mode setting on the farm work machine 1 is erroneous, a corresponding work mode change instruction will be transmitted to the work mode setting unit 46 for making the mode change. Alternatively, the worker may directly provide the work mode setting unit 46 with his/her operational input for making the mode change. When such work mode change instruction is given to the work mode setting unit 46, the work mode setting unit 46 will provide an appropriate change instruction to the implement control unit 47 for the corresponding implement, so that the work mode will be set again based on the received work mode change instruction. Conversely, if it is determined that the registered work mode stored in the computer system 6 is erroneous, an appropriate work mode change instruction will be transmitted to the computer system 6 via the communication network, whereby the registered work mode registered in the database 65 will be rewritten.

As described above, with utilization of the bidirectional data communication arrangement between the farm work machine 1 and the computer system 6 on the management center side via the communication terminal 5, additional data transmission as follows is also possible after the work. This farm work machine 1 is equipped with a function of storing data related to work acquired by any one of a group of sensors 20 during implementation of a work. The data include not only such work machine information as a work traveling distance and a work period, but also farm product data such as a quality data and a harvest amount data of harvested products, if the farm work machine 1 is a farm crop harvester. And, these data are outputted as evaluation information of the farm work from the farm work machine 1 and transmitted to the communication terminal 5. Then, the communication terminal 5 will display the received evaluation information on a display device and will forward this information to the computer system 6 also. This evaluation information received by the computer system 6 will be linked with the information related to that particular field ("field information") and rendered as such into a database to be stored therein. The field information can include a field number, a field ownership, a field address, a field position (location) a field growing product type, etc.

Figure 2:
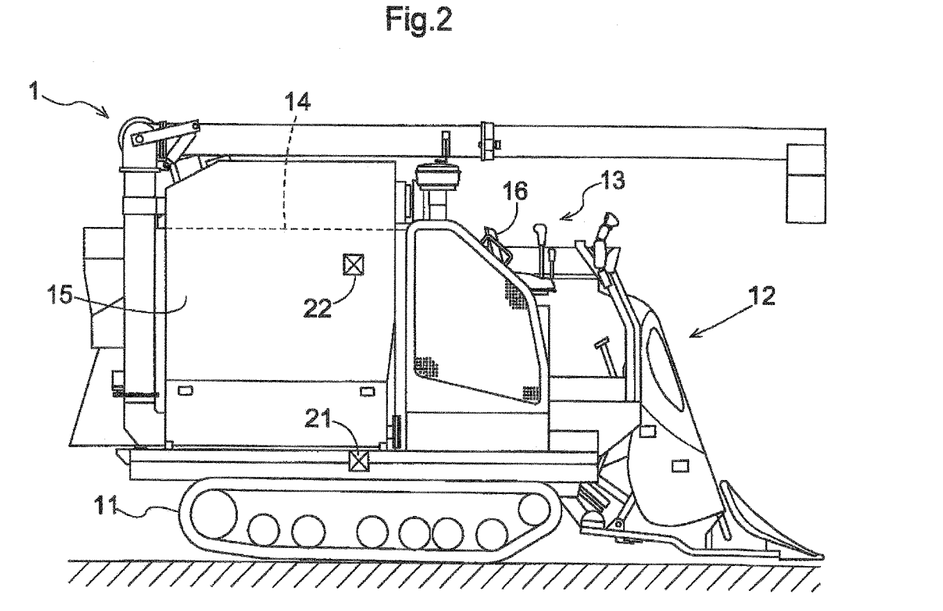
FIG. 2 is a side view showing a combine harvester ("combine") which is one example of a farm work machine according to one embodiment of this disclosure.

Next, one specific embodiment of a farm work machine related to this disclosure will be described with reference to the accompanying drawings. FIG. 2 is a side view of a combine harvester (simply referred to as "combine" also hereinafter) 1 which is one example of the farm work machine.

This combine 1 is a crawler type self-threshing type combine 1. Its traveling mechanism includes crawler traveling units 11 rotatably driven by an engine. The combine 1 further includes a harvester unit 12 disposed at a front section, a driver's section 13 at an intermediate section, and a thresher unit 14 and a grain tank 15 at a rear section, respectively. Though shown only schematically, at a lower portion of the grain tank 15, there is mounted a harvest amount sensor 21 for detecting a weight of grains harvested. Inside the grain tank 15, there is mounted a gustatory meter (gustatory sensor unit) 22 as an example of a "quality sensor". From this gustatory meter 22, determination data such as a moisture value and a protein value of the grains are outputted as quality data. The harvested amount sensor 21 and the gustatory meter 22 are constituents of the sensor group 20.

Though not shown, inside the driver's section 13, there are disposed various control levers and control switches to be operated by a worker seated in a driver's seat 16 as well as a meter display panel for reporting various kinds of information to the worker. Further, in the instant embodiment, the communication terminal 5 is provided as a smart phone carried by the worker and various functions needed for realizing the technique of this disclosure are installed therein as "applications". The smart phone 5, with using its standard functions, can be connected with the computer system 6 of the management center to be able to effect data communication therewith, via a mobile phone communication network and the internet. The smart phone 5 can be moreover connected to an ECU (electronic control unit) mounted on the combine 1 for data communication therewith, with using an appropriate short-distance communication protocol such as Wi-Fi.

Figure 3:
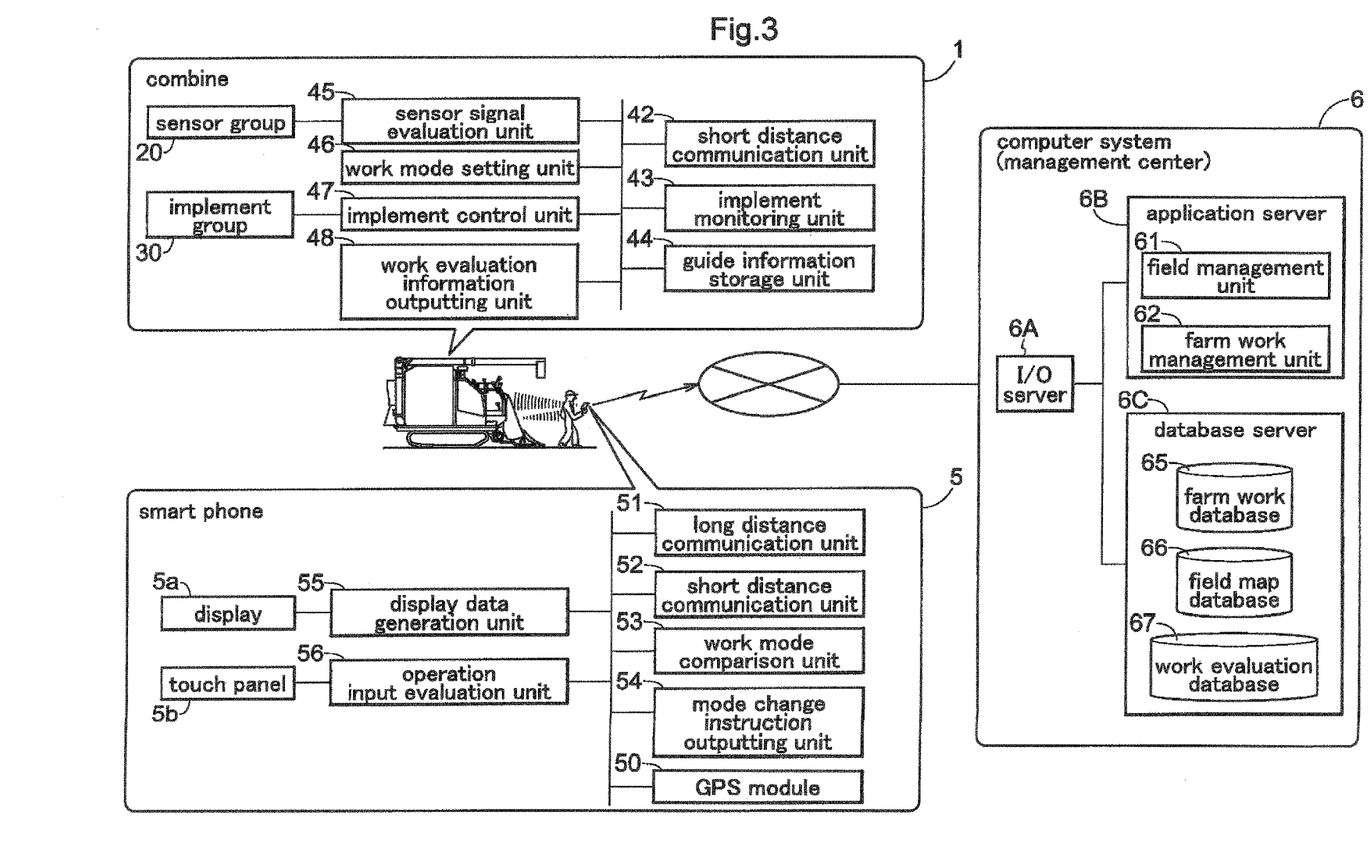
FIG. 3 is a functional block diagram showing functional sections or units built in the combine, a smart phone and a management center.

FIG. 3 shows a functional block diagram showing various functions, particularly related to this disclosure, which are incorporated in the ECU of the combine 1, the smart phone 5 and the computer system 6 of the management center.

The ECU of the combine 1 includes a short-distance communication unit 42, an implement monitoring unit 43, a guide information storage unit 44, a sensor signal evaluation unit 45, a work mode setting unit 46, an implement control unit 47, and a work evaluation information outputting unit 48. The short-distance communication unit 42 is provided for effecting data communication with the smart phone 5 and operations according to the standard of wireless LAN or Bluetooth (registered trademark). The implement monitoring unit 43 is provided for monitoring conditions of various utility implements mounted on the combine 1 and configured to detect e.g. sensor failure, oil pressure failure, operation error, etc. and to output an instruction needed therefor. The guide information storing unit 44 stores implement operation guide information for each work mode. In the case of detection of e.g. any operational inconvenience or failure of implement in the course of implementation of a work based on a particular work mode, operational information useful for the worker will be transmitted to the smart phone 5. This useful operational information is included in the implement operation guide information described above. For instance, if a certain inconvenience is detected by the implement monitoring unit 43 which keeps monitoring a condition of the implement, based on an instruction from the implement monitoring unit 43, useful information related to the inconvenience of the implement group 30 as the monitoring targets or operational procedure will be transmitted to the smart phone 5. The sensor signal valuation unit 45 is connected not only to the sensors for the implement group 30, but also to the harvested amount sensor 21 and the gustatory meter 22 and outputs data related to the harvested amount of grains, the moisture value and the protein value of the grains as the quality data. The work mode setting unit 46 is provided for setting a work mode for a farm work to be effected by the combine 1. As each work mode includes setting parameters for the number of implement group 30, the work mode setting unit 46 gives the implement control unit 47 parameters for the implement group 30 for creating a particular work mode. Then, based on the given parameters for the implement group 30, the implement control unit 47 effects an adjustment to render the implement group 30 suitable to the work mode to be implemented. After completion of the farm work for one unit of field, the work evaluation information outputting section 48 outputs, in a predetermined format, such data as the work traveling distance, the work period, the harvested amount of crops, the moisture value and the protein value of the crops, as evaluation information of the farm work which has been effected in this particular field; and also outputs the information of said one unit of field.

The smart phone 5 includes a GPS module 50, a long-distance communication unit 51, the short-distance communication unit 52, the work mode comparison unit 53, the mode change instruction outputting unit 54, the display data generation unit 55, an operation input evaluation unit 56, etc. The GPS module 50 has a function of determining an absolute position according to the geographical coordinates (longitudes and latitudes) under the principle of Global Positioning System. Therefore, based on this determination data, it is possible to obtain the position on the map of the smart phone 5, and thus substantially the same of the combine 1. A GPS module is included in a car navigation system as well. Therefore, in case the combine 1 mounts a car navigation system onboard and is connected with the ECU, a combine position can be obtained from the combine 1 alternatively. The long-distance communication unit 51 includes a communication module that can be connected to the internet via the mobile phone network, so that the unit 51 can effect data communication with the computer system 6 connected to the internet. The short-distance communication unit 52 effects data communication with the short distance communication unit 42 of the combine 1. The work mode comparison unit 53 checks if any difference exists between a registered work mode for combine farm work registered in advance for each field in the computer system 6 of the management center, and a set work mode currently set to the combine 1. The mode change instruction outputting unit 54 outputs a mode change instruction for changing either work mode in case the work mode comparison unit 53 has determined that a difference exists between the registered work mode and the currently set work mode. Basically, such determination will be made that the work mode of the combine 1 is not correctly set, so that a mode change instruction for changing the contents of the currently set work mode to the contents of the registered work mode will be outputted. However, in case the difference is attributable apparently to a registration error, based on a worker's judgment or after inquiry made by the worker to the client for the work, a mode change instruction for changing the contents of the registered work mode will be outputted. The output of such a mode change instruction for changing the registered work mode will be effected with a worker's input operation on a touch panel 5b. In order to allow the worker to confirm the result of comparison by the work mode comparison unit 53, this comparison result will be made into display data by the display data generation unit 55, and will be displayed on the display 5a such as a liquid crystal display, i.e. the display screen of the smart phone 5. Basically, this display data generation unit 55 is incorporated as a basic function in the smart phone 5. The operation input evaluation unit 56 is also incorporated as another basic function in the smart phone 5 for interpreting the operation intention of the worker based on his/her operational input on the touch panel 5b. Further, a "farm work information acquisition function" for reading the farm work information associated with a selected target farm work sector from the computer system 6 of the management center with using the communication network; a "work mode comparison function" for comparing the set work mode with the registered work mode included in the farm work information and outputting the result of the comparison; a "display data generation function" for generating display data to be displayed on the display indicative of the result of the comparison, etc. can be stored in advance in a recording medium that is attached to the smart phone 5, so that these functions can be installed in the smart phone 5 by attaching the recording medium when needed and/or desired.

The computer system 6 includes an input/output server ("I/O server" hereinafter) 6A, an application server 6B and a database server 6C. The I/O server 6A has "a data inputting function" for forwarding data received from the smart phone 5 to the application server 6B or the database server 6C; and "a data outputting function" for transmitting, to the smart phone 5, the data generated by the application server 6B or the data retrieved from the database server 6C. Thus, in this embodiment, the I/O server 6A is configured as a Web server. Incidentally, the I/O server 6A, the application server 6B and the database server 6C can be configured as a distributed or virtual computer system such as a cloud system, rather than being physically combined into a single integrated computer system.

The application server 6B includes a field management unit 61 and a farm work management unit 62 both being constructed in the form of software. The field management unit 61 manages field information in cooperation with the database server 6C based on information input from a farm household, an agricultural organization, etc. The field information comprises field-related information such as a field number, a field name, a field address, a field map position, a field shape, a field area, a field planting species, etc. The field work management unit 62 manages farm work information in cooperation with the database server 6C. The farm work information is typically transmitted from the farm work machine such as a combine, or from the smart phone 5 of the worker who uses such a farm work machine; and the farm information comprises farm work-related information for each field such as rice planting, a weeding, a pesticide spraying, a fertilization, a harvesting, etc. In this embodiment, the database server 6C includes the farm work database 65, a field map database 66 and a work evaluation database 67 to act as respective databases particularly related to this disclosure. The farm work database 65 stores the field information and the farm work information described above. Incidentally, the farm work information includes data indicating a registered work mode which is a work mode of the combine 1. The field map database 66 stores maps of fields linked with e.g. field numbers and/or map locations; and can extract and output map data of corresponding field and its periphery, with using a field number and/or a field map location as search conditions. The work evaluation database 67 stores, in linkage with the field information, evaluation information transmitted from the work evaluation information outputting unit 48 of the combine 1 via the smart phone 5. The evaluation information is stored for respective fields including past data thereof, so that the evaluation information can be also utilized for continuous evaluation purposes of a same field.

Figure 4:
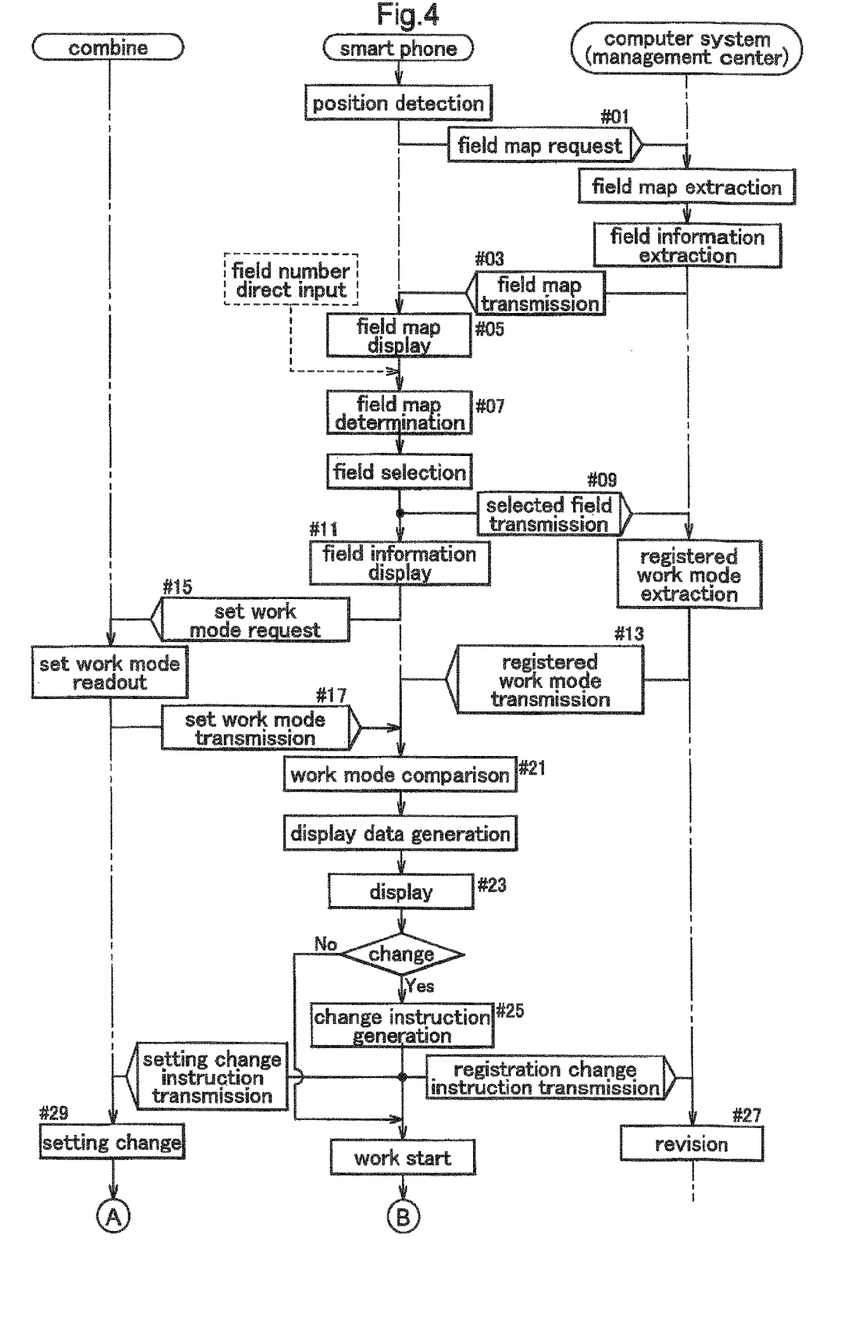
FIG. 4 is a chart diagram illustrating processes that are respectively effected at the combine, the smart phone and the management center, and a flow of data passed from one to another.
Figure 5:
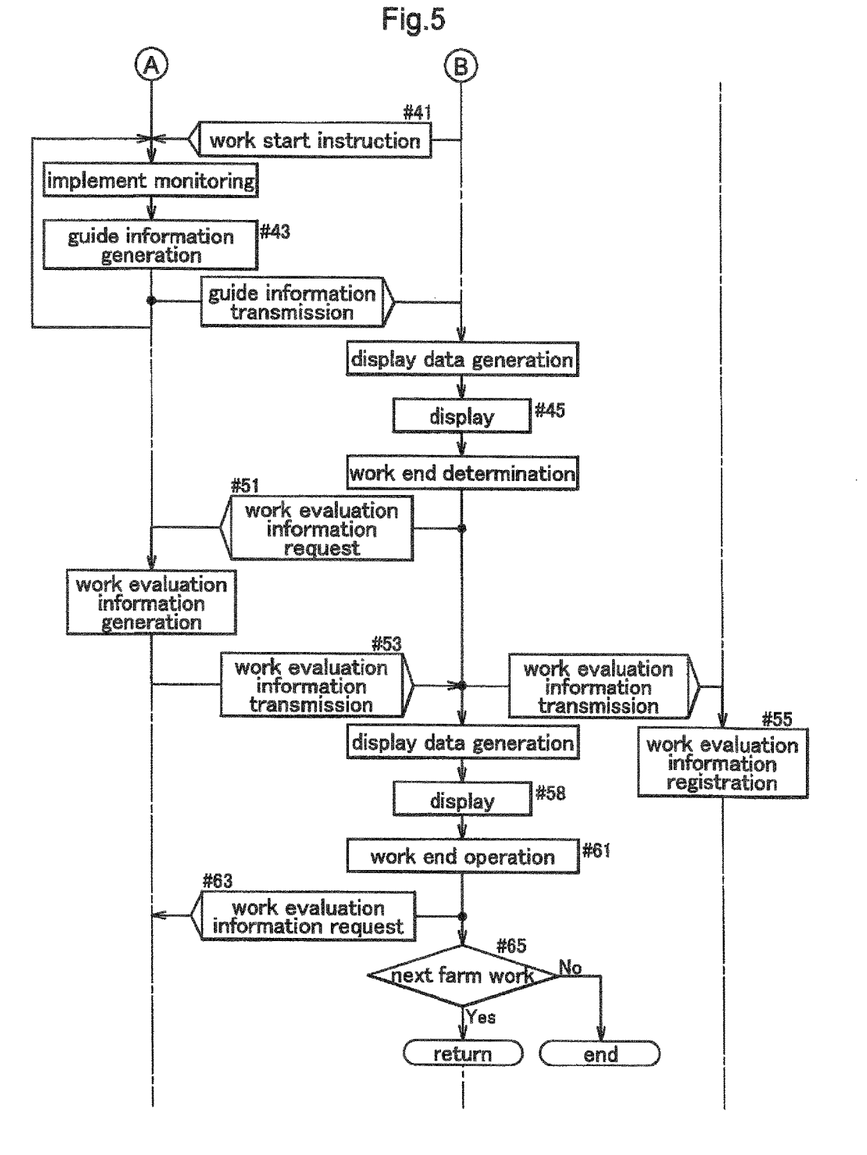
FIG. 5 is a further chart diagram illustrating processes that are respectively effected at the combine, the smart phone and the management center, and a further flow of data passed from one to another.

Next, processes respectively effected at the combine 1, the smart phone 5 and the computer system 6 in the farm management system having the above-described configuration will be described with reference to a flow chart which is divided into FIG. 4 and FIG. 5, as well as a flow of data passed from one to another.

Figure 6:
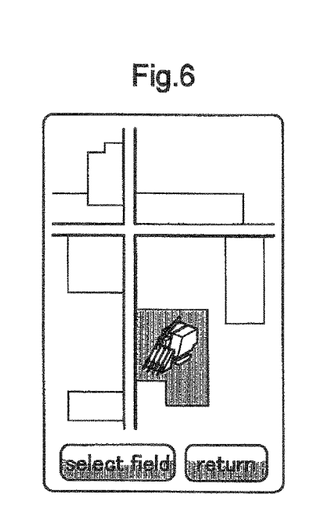
FIG. 6 is a display screen view showing an example of a display screen on the smart phone.
Figure 7:
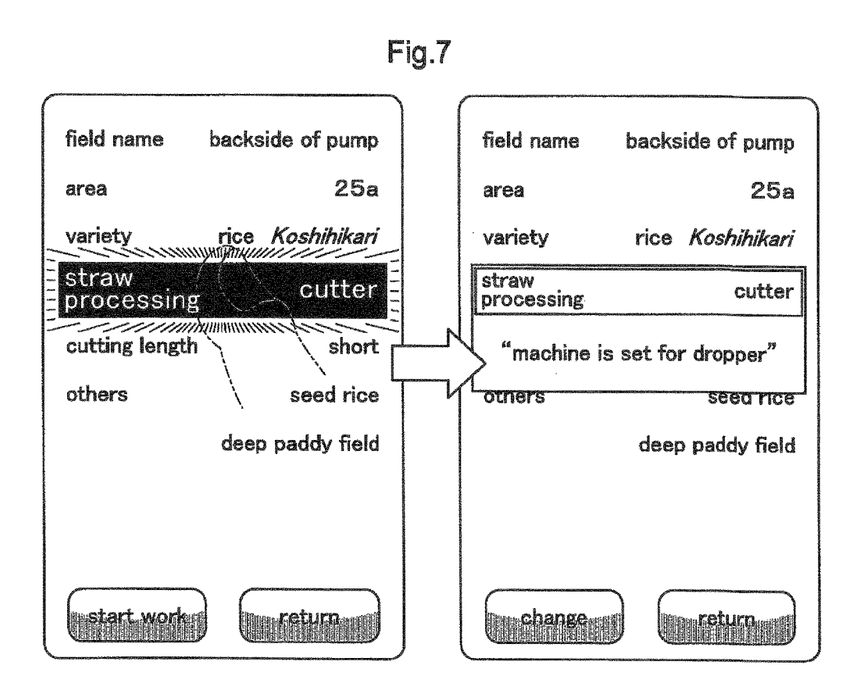
FIG. 7 is a display screen view showing another example of display screen on the smart phone.

When this combine 1 arrives at a vicinity of a farm field as a target of harvesting work, based on the operational input by the worker, there is generated positioning data (in longitude and latitude) indicative of the current position of the smart phone 5 (and thus that of the combine 1) by the GPS module 50 of the smart phone 5; and the positioning data will be incorporated in a request for a field map and sent to the computer system 6 of the management center (#01). In response to the field map request, the field management unit 61 sends out map data of the corresponding field extracted from the field map database 66, and field information of the corresponding field extracted from the farm work database 65 (#03). The smart phone 5 generates a field map as shown in FIG. 6 based on the map data received by the display data generation unit 55; and displays the generated field map on a display 5a (#05). The display screen of the display 5a is provided in the form of a field selection screen, so that a worker may click the display screen to select the field associated his/her work, and then press a field selection button on the screen to determine the field to work (#07). Incidentally, instead of such field selection using a map described above, in case a field number is given to the field, the worker may directly input the field number to be sent to the computer system 6. Once the work field is determined, the field number of the selected field is sent to the computer system 6 (#09). Simultaneously therewith, the field information of the selected field is displayed on the display 5a as shown in FIG. 7 (#11). On the other hand, in the computer system 6, the farm work management unit 62 reads out, from the farm work database 65, a registered work mode for carrying out the farm work assigned to this field, based on the received ID number of the field; and sends the registered work mode to the smart phone 5 (#13). Further, at the same time, the smart phone 5 effects a short distance communication with the combine 1 and requests forwarding of the set work mode (#15). In response to this forwarding request, the work mode setting unit 46 reads out the currently set work mode and sends this to the smart phone 5 (#17).

In succession, the work mode comparison unit 53 effects comparison between the registered work mode received from the computer system 6 and the set work mode received from the combine 1; and checks whether the parameters included in these work modes are in agreement or not (#21). The result of this comparison will be rendered into display data, which will then be displayed on the monitor 5a (#23). The contents of this display can include e.g. a warning to the effect that a wheat mode is erroneously set for a rice harvesting work in actuality; a warning to the effect that the set work mode is erroneously a cutter field mode (mode of discharging a straw onto the field after it is cut), while the registered work mode is actually a dropper field (mode of discharging an uncut straw onto the field), etc. If the registered work mode and the set work mode are in agreement with each other, this fact of agreement will be displayed. In the case of disagreement between the registered work mode and the set work mode, changing either one of the registered work mode or the set work mode will be necessary. In this case, therefore, the mode change instruction outputting unit 54 generates a mode change instruction in response to the operational input by the worker (#25). If a request for changing the registered work mode is issued, a registration change instruction will be sent to the computer system 6 and the corresponding data in the farm work database 65 will be rewritten (#27). Conversely, if a request for changing the set work mode is requested, a setting change instruction will be sent to the computer system 1; and the work mode setting unit 46 effects the setting change of the work mode (#29).

After final determination of the work mode, the worker will carry out an operational input of a start of the work (#41). In response to this work start instruction, an implement monitoring process will be effected until completion of this work. In this implement monitoring process, the implement monitoring unit 43 will check the situation of the work implement and whether the worker's operation has been effected appropriately or not; and will generate implement operation guide information needed for the worker (#43). The generated implement operation guide information will be sent to the smart phone 5 via the short-distance communication. Then, this implement operation guide information received by the smart phone 5 will be rendered into display data by the display data generation unit 55 and then displayed on the display 5a (#45). The contents of this display can be e.g. "Press harvested amount determination switch"; "Check lens of gustatory sensor" "Store unloader", etc.

After completion of the farm work, the worker will operate to input work completion, and then a work evaluation information request will be sent from the smart phone 5 to the combine 1 (#51). In response to the request for work evaluation information, the work evaluation information outputting unit 48 will generate evaluation information of the farm work effected in the set work mode and send the evaluation information to the smart phone 5 (#53). The evaluation information includes e.g. field information, implement information, work mode, worker information, harvested product information, work result information, etc. The field information includes field name, field address, field code, area, planting speed, etc. The implement information includes an implement number, an implement name, an implement type code, etc. The worker information includes an ID code, name of the worker, etc. The harvested product information includes a harvested amount, a grain moisture ratio, a grain protein ratio, etc. The work result information includes a work period, a work traveling distance, a fuel consumption amount, etc. Incidentally, work items specifying a work mode include e.g. a straw cutting work, an uncut straw dropping work, a straw cutting length, a straw scattering request, etc.

Figure 8:
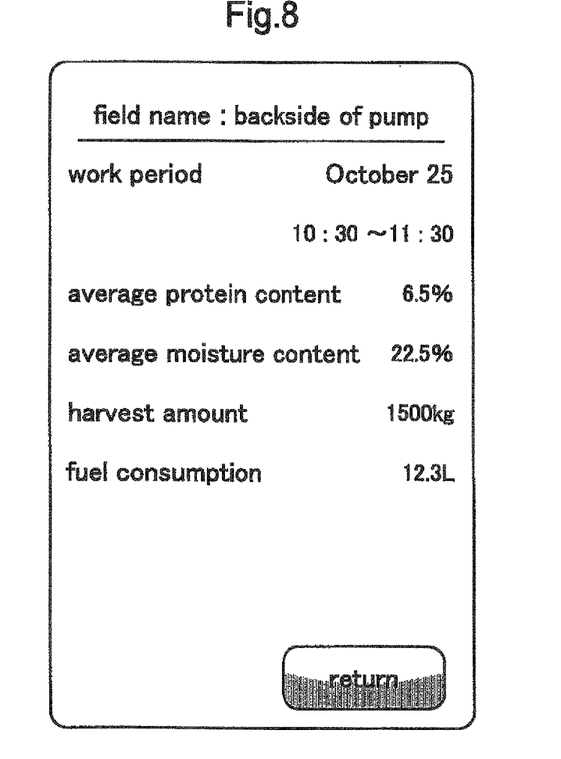
FIG. 8 is a display screen view showing a still another example of display screen on the smart phone.

The evaluation information received by the smart phone 5 will be forwarded on one hand to the computer system 6 of the management center and registered in the work evaluation database 67 (#55). On the other hand, the evaluation information will be rendered into display data by the display data generation unit 55 and will be displayed on the display 5a, as shown in FIG. 8, for instance (#58). When the worker operates to input work completion (#61), a work completion instruction will be sent from the smart phone 5 to the combine 1 (#63). If any work in a next field remains, a field selection will be made again and the above-described operations will be repeated (#65).

Other Embodiments (1) In the foregoing embodiment, a combine harvester was employed as a farm work machine and a smart phone was employed as a mobile communication terminal. The present disclosure is applicable to other work machines such as a tractor, a rice planting machine, a fertilizer machine, a pesticide spraying machine, a weeding machine, etc. And, the disclosure is applicable to other mobile communication terminals such as a tablet computer, a laptop computer, a navigator device, etc.

(2) In the foregoing embodiment, the work mode comparison unit 53 and the mode change instruction outputting unit 54 were configured in the smart phone 5, with utilization of the application installing function of the smart phone 5, to provide respectively important functions in this disclosure. Instead thereof, only the data displaying function, operation inputting function and communication function that are originally provided in the smart phone 5 can be utilized in the smart phone 5; and the other computer processing functions can be configured in the ECU of the combine 1 or the computer system 6 of the management center. That is, any possible arrangements of distributing the computer processing functions needed for realization of the present disclosure among the combine 1, the mobile communication terminal 5 and the computer system 6 are understood to be included within the scope of the present disclosure.

(3) In the foregoing embodiment, the display 5*a* of the smart phone 5 was employed to present various kinds of information to the worker. Instead thereof, a display on the combine can be used, or these displays may be used together in combination.

INDUSTRIAL APPLICABILITY

The present disclosure is applicable to a system which carries out data exchange respecting a work mode, among a farm work machine, a mobile communication terminal and a management center.

DESCRIPTION OF REFERENCE NUMERALS/MARKS

- 1: combine (farm work machine)
- 42: short distance communication unit
- 43: implement monitoring unit
- 44: guide information storage unit
- 45: sensor signal evaluation unit
- 46 work mode setting unit
- 47: implement control unit
- 48: work evaluation information outputting unit
- 5: smart phone (mobile communication terminal, communication unit)
- 50: GPS module
- 51: long distance communication unit
- 52: short distance communication unit
- 53: work mode comparison unit
- 54: mode change instruction outputting unit
- 55: display data generation unit
- 56: operation input evaluation unit
- 6: computer system (management center)
- 6A: input/output (I/O) server
- 6B: application server
- 6C: database server
- 61: field management unit
- 62: farm work management unit
- 65: farm work database
- 66: field map database
- 67: work evaluation database

What is claimed is:

1. A farm work machine operable in a variety of work modes, comprising:
    a communication unit that reads farm work information for a selected target farm work sector from a database of a management center storing the farm work information for each farm work sector, with using a communication network;
    a work mode setting unit that sets work modes;
    a work mode comparison unit that effects comparison between a set work mode set by the work mode setting unit for the selected target farm work sector and a registered work mode included in farm work information for the selected target farm work sector read from the database;
    a display data generation unit that generates display data based on the farm work information and the result of the comparison in order to display the farm work information read by the communication unit and result of the comparison effected by the mode comparison unit on a display; and
    a mode change instruction outputting unit that outputs a mode change instruction to change either one of the work set mode for the selected target farm work sector and the registered work mode for the selected target farm work sector to agree to the other of the work set mode for the selected target farm work sector and the registered work mode for the selected target farm work sector if the work mode comparison unit has determined that a difference exists between the work set mode for the selected target farm work sector and the registered work mode for the selected target farm work sector,
    wherein the mode change instruction sets a parameter of the farm work machine that controls carrying out farm work in the selected target farm work sector with the farm work machine.

2. The farm work machine according to claim 1, wherein selection of the target farm work section is made based on a current position detected by a position detection unit.

3. The farm work machine according to claim 1, further comprising a work evaluation information outputting unit for outputting evaluation information of the farm work effected in the work mode at the time of completion of the farm work, wherein
    the display data generation unit generates display data based on the evaluation information to display contents of the evaluation information on the monitor.

4. The farm work machine according to claim 3, wherein the evaluation information is sent via the communication unit to the management center.

5. The farm work machine according to claim 1, further comprising:
    a guide information storage unit for storing implement operation guide information for each work mode; and
    an implement monitoring unit for monitoring a condition of a utility implement;
    wherein in accordance with an instruction from the implement monitoring unit, implement operation guide information for an implement as a monitoring target is read from the guide information storage section and provided to the display data generation unit.

6. The farm work machine according to claim 1, wherein the communication unit comprises a mobile communication terminal that performs data communication with a communication unit included in the farm work machine, and the work mode comparison unit and the display data generation unit are included in the mobile communication terminal.

7. A farm work management program provided in a mobile communication terminal that performs data communication with a farm work machine used for carrying out a farm work in a work mode set by a work mode setting unit among a variety of work modes, wherein the farm work management program causes a computer to execute:
    a farm work information acquisition function that reads farm work information for a selected target farm work sector from a database of a management center storing the farm work information for each farm work sector via a communication network;
    a work mode comparison function that effects comparison between a set work mode for the selected target farm work sector set by a work mode setting unit and a registered work mode for the selected target farm work sector included in farm work information read from the database;
    a display data generation function that generates display data based on the farm work information and result of the comparison in order to display the read farm work information and the result of comparison on a display; and a mode change instruction outputting function that outputs a mode change instruction to change either one of the work set mode for the selected target farm work sector and the registered work mode for the selected target farm work sector to agree to the other of the work set mode for the selected target farm work sector and the registered work mode for the selected target farm work sector if the work mode comparison function has determined that a difference exists between the work set mode for the selected target farm work sector and the registered work mode for the selected target farm work sector, wherein the mode change instruction sets a parameter of the farm work machine that controls carrying out farm work in the selected target farm work sector with the farm work machine.

8. A non-transitory recording medium recording a farm work management program provided in a mobile communication terminal that performs data communication with a farm work machine used for carrying out a farm work in a work mode set by a work mode setting unit among a variety of work modes, wherein the farm work management program is recorded in the recording medium in order to cause a computer to execute:

a farm work information acquisition function that reads farm work information for a selected target farm work sector from a database of a management center storing the farm work information for each farm work sector via a communication network;

a work mode comparison function that effects comparison between a set work mode for the selected target farm work sector set by a work mode setting unit and a registered work mode for the selected target farm work sector included in farm work information read from the database;

a display data generation function that generates display data based on the farm work information and result of the comparison in order to display the read farm work information and the result of comparison on a display; and a mode change instruction outputting function that outputs a mode change instruction to change either one of the work set mode for the selected target farm work sector and the registered work mode for the selected target farm work sector to agree to the other of the work set mode for the selected target farm work sector and the registered work mode for the selected target farm work sector if the work mode comparison function has determined that a difference exists between the work set mode for the selected target farm work sector and the registered work mode for the selected target farm work sector, wherein the mode change instruction sets a parameter of the farm work machine that controls carrying out farm work in the selected target farm work sector with the farm work machine.

9. A farm work management method effected with using a mobile communication terminal that performs data communication with a farm work machine used for carrying out a farm work in a work mode set by a work mode setting unit among a variety of work modes, the method comprising:

a farm work information acquisition step for reading farm work information for a selected target farm work sector from a database of a management center storing the farm work information for each farm work sector via a communication network;

a work mode comparison step for effecting comparison between a set work mode for the selected target farm work sector set by a work mode setting unit and a registered work mode for the selected target farm work sector included in farm work information read from the database;

a display data generation step for generating display data based on the farm work information and result of the comparison in order to display the read farm work information and the result of comparison on a display; and a mode change instruction outputting step that outputs a mode change instruction to change either one of the work set mode for the selected target farm work sector and the registered work mode for the selected target farm work sector to agree to the other of the work set mode for the selected target farm work sector and the registered work mode for the selected target farm work sector if the work mode comparison step has determined that a difference exists between the work set mode for the selected target farm work sector and the registered work mode for the selected target farm work sector, wherein the mode change instruction sets a parameter of the farm work machine that controls carrying out farm work in the selected target farm work sector with the farm work machine.

* * * * *

UNITED STATES PATENT AND TRADEMARK OFFICE
CERTIFICATE OF CORRECTION

PATENT NO. : 10,251,341 B2
APPLICATION NO. : 15/349115
DATED : April 9, 2019
INVENTOR(S) : Kazuhiro Takahara et al.

Page 1 of 1

It is certified that error appears in the above-identified patent and that said Letters Patent is hereby corrected as shown below:

On the Title Page

Column 1, below Item (62), Line 3, insert:
-- (30) Foreign Application Priority Data
Jan. 21, 2013 (JP)..................................2013-008733 --

Signed and Sealed this
Eighteenth Day of June, 2019

Andrei Iancu
*Director of the United States Patent and Trademark Office*